US009936114B2

(12) United States Patent
Baym et al.

(10) Patent No.: US 9,936,114 B2
(45) Date of Patent: Apr. 3, 2018

(54) MOBILE DEVICE FOR REQUESTING THE CAPTURE OF AN IMAGE

(71) Applicant: Elwha LLC, Bellevue, WA (US)

(72) Inventors: Michael H. Baym, Cambridge, MA (US); William D. Duncan, Kirkland, WA (US); Roderick A. Hyde, Redmond, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 50 days.

(21) Appl. No.: 14/063,656

(22) Filed: Oct. 25, 2013

(65) Prior Publication Data

US 2015/0116520 A1 Apr. 30, 2015

(51) Int. Cl.
*H04N 5/232* (2006.01)
*H04N 5/44* (2011.01)

(52) U.S. Cl.
CPC .......... *H04N 5/23203* (2013.01); *H04N 5/44* (2013.01)

(58) Field of Classification Search
None
See application file for complete search history.

(56) References Cited

U.S. PATENT DOCUMENTS

| 6,628,899 B1 | 9/2003 | Kito |
| 6,819,783 B2 | 11/2004 | Goldberg et al. |
| 7,327,383 B2 | 2/2008 | Valleriano et al. |
| 7,456,871 B2 | 11/2008 | Iida et al. |
| 7,602,421 B2 | 10/2009 | Hunter et al. |
| 7,671,902 B2 | 3/2010 | Mindrum et al. |
| 7,679,650 B2 | 3/2010 | Nakajima |
| 7,742,625 B2 | 6/2010 | Pilu |
| 7,840,450 B2 | 11/2010 | Brahmbhatt et al. |
| 7,868,926 B2* | 1/2011 | Rainier .................. H04N 5/232 348/208.16 |
| 2002/0167522 A1 | 11/2002 | Miyazawa |
| 2003/0020811 A1* | 1/2003 | Hunter et al. ................. 348/143 |
| 2003/0038878 A1 | 2/2003 | Lee et al. |
| 2003/0069762 A1* | 4/2003 | Gathman et al. .................. 705/5 |
| 2004/0165063 A1 | 8/2004 | Iida et al. |
| 2005/0011959 A1* | 1/2005 | Grosvenor ..................... 235/470 |
| 2005/0093976 A1 | 5/2005 | Valleriano et al. |
| 2005/0286883 A1 | 12/2005 | Abe et al. |
| 2006/0107296 A1 | 5/2006 | Mock et al. |
| 2006/0152592 A1 | 7/2006 | Chishima et al. |

(Continued)

FOREIGN PATENT DOCUMENTS

JP 2004029808 A * 1/2004 ............. G03B 17/53
JP 2011024139 A 2/2011

OTHER PUBLICATIONS

PCT International Search Report; International App. No. PCT/US2014/061926; dated Feb. 2, 2015; pp. 1-3.

*Primary Examiner* — Roberto Velez
*Assistant Examiner* — Yih-Sien Kao
(74) *Attorney, Agent, or Firm* — Foley & Lardner LLP

(57) ABSTRACT

A mobile device for requesting a capture of an image includes a beacon and a processing circuit. The beacon is configured to communicate with an unmanned camera. The processing circuit is configured to generate a request for the unmanned camera to capture an image of a user of the mobile device, where the request includes a condition that must be met by the image of the user, and send the request, via the beacon, to the unmanned camera.

35 Claims, 9 Drawing Sheets

(56) References Cited

U.S. PATENT DOCUMENTS

| | | |
|---|---|---|
| 2006/0158544 A1 | 7/2006 | Nakajima |
| 2006/0197840 A1 | 11/2006 | Neal et al. |
| 2007/0220173 A1* | 9/2007 | Ohga et al. .................. 709/250 |
| 2008/0051033 A1 | 2/2008 | Hymes |
| 2008/0082264 A1 | 4/2008 | Hill et al. |
| 2008/0278582 A1* | 11/2008 | Chung et al. ................. 348/159 |
| 2008/0297608 A1 | 12/2008 | Border et al. |
| 2009/0136221 A1* | 5/2009 | Nakamura ....................... 396/1 |
| 2009/0192945 A1* | 7/2009 | Perpina ................. G06Q 30/06 705/80 |
| 2010/0009700 A1 | 1/2010 | Camp et al. |
| 2010/0026816 A1 | 2/2010 | Bergstrom et al. |
| 2010/0029326 A1 | 2/2010 | Bergstrom et al. |
| 2010/0128138 A1* | 5/2010 | Nitta ................. H04N 1/00458 348/222.1 |
| 2010/0225773 A1* | 9/2010 | Lee ....................... H04N 5/232 348/222.1 |
| 2010/0277611 A1 | 11/2010 | Holt et al. |
| 2011/0050915 A1* | 3/2011 | Wang et al. ............. 348/207.99 |
| 2011/0063443 A1* | 3/2011 | Yang ........................... 348/148 |
| 2011/0115937 A1* | 5/2011 | Sassa ......................... 348/222.1 |
| 2012/0081392 A1* | 4/2012 | Arthur ......................... 345/633 |
| 2012/0150364 A1 | 6/2012 | Tillotson et al. |
| 2012/0246295 A1* | 9/2012 | Gonzalez-Banos et al. . 709/224 |
| 2012/0271491 A1 | 10/2012 | Spata |
| 2012/0310753 A1* | 12/2012 | Gaddis ....................... 705/14.73 |
| 2013/0100255 A1* | 4/2013 | Ohba et al. .................... 348/47 |
| 2013/0107062 A1* | 5/2013 | Okazaki ..................... 348/207.1 |

* cited by examiner

MOBILE DEVICE FOR REQUESTING THE CAPTURE OF AN IMAGE

BACKGROUND

Unmanned cameras have become ubiquitous in modern society. For example, cameras are now installed on street lights, buildings, bridges, along public transportation routes, etc. Typically, these unmanned cameras are configured for a variety of primary operations, including security monitoring, traffic monitoring, and road safety monitoring. Also, these cameras are often connected to a monitoring center or otherwise linked to the Internet such that the cameras may communicate with other devices.

SUMMARY

One embodiment relates to a mobile device for requesting a capture of an image, the mobile device includes a beacon and a processing circuit. The beacon is configured to communicate with an unmanned camera. The processing circuit is configured to generate a request for the unmanned camera to capture an image of a user of the mobile device, where the request includes a condition that must be met by the image of the user, and send the request, via the beacon, to the unmanned camera.

Another embodiment relates to a method of requesting a capture of an image. The method includes generating, with a processing circuit, a request for an unmanned camera to capture an image of a user of a mobile device comprising the processing circuit and a beacon, wherein the beacon is configured to communicate with the unmanned camera, and wherein the request includes a condition that must be met by the image of the user. The method further includes sending the request, via the beacon, to the unmanned camera.

Another embodiment relates to a non-transitory computer-readable medium having instructions stored thereon, that when executed by a computing device cause the computing device to perform operations for requesting a capture of an image. The operations include generating a request for an unmanned camera to capture an image of a user of a mobile device comprising a beacon, wherein the beacon is configured to communicate with the unmanned camera, and wherein the request includes a condition that must be met by the image of the user. The operations further include sending the request, via the beacon, to the unmanned camera.

Another embodiment relates to a mobile device for requesting a capture of an image, the mobile device includes a beacon and a processing circuit. The beacon is configured to communicate with an unmanned camera. The processing circuit is configured to generate a request for the unmanned camera to capture an image of a user of the mobile device, where the request stipulates a price that the user will pay for the image, and send the request, via the beacon, to the unmanned camera.

Another embodiment relates to a method of requesting a capture of an image. The method includes generating, with a processing circuit, a request for an unmanned camera to capture an image of a user of a mobile device comprising the processing circuit and a beacon, wherein the beacon is configured to communicate with the unmanned camera, and wherein the request stipulates a price that the user will pay for the image. The method further includes sending the request, via the beacon, to the unmanned camera.

Another embodiment relates to a non-transitory computer-readable medium having instructions stored thereon, that when executed by a computing device cause the computing device to perform operations for requesting a capture of an image. The operations include generating a request for an unmanned camera to capture an image of a user of a mobile device comprising a beacon, wherein the beacon is configured to communicate with the unmanned camera, and wherein the request stipulates a price that the user will pay for the image. The operations further include sending the request, via the beacon, to the unmanned camera.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
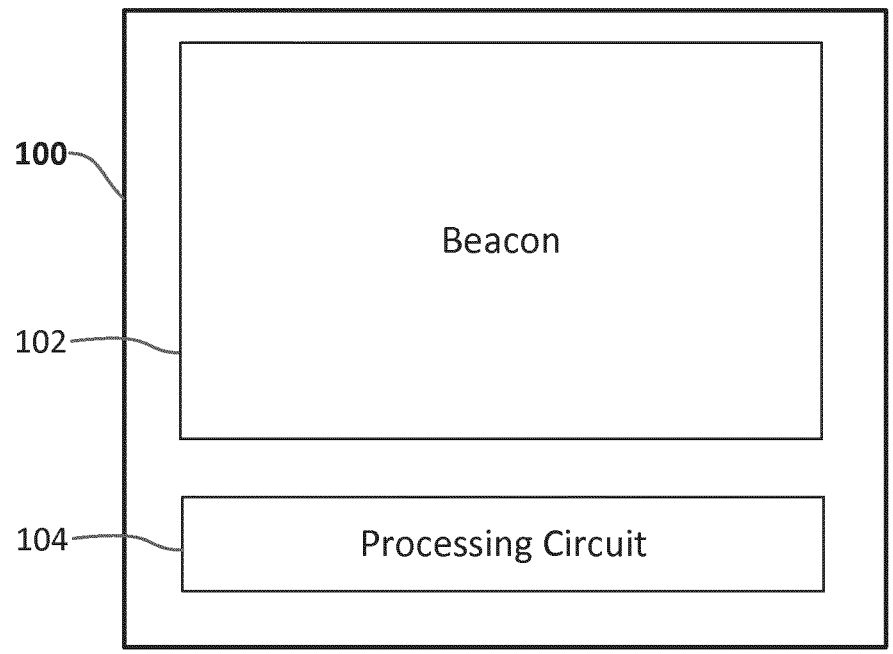
FIG. 1 is a block diagram of a mobile device for requesting the capture of an image according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the scope of the subject matter presented here.

Referring generally to the figures, various embodiments of mobile devices, methods, and computer readable mediums for requesting the capture of an image are shown and described. In general, unmanned cameras have become commonplace in the present-day world. Particularly in urban environments cameras are used to automatically monitor roads, traffic, stores, walkways, and public transportation routes (e.g., elevated trains, subways, buses, etc.). These cameras are usually connected to a network, the Internet, a control center, etc., so that they may transmit images/video and be remotely accessed or otherwise controlled. The prevalence of unmanned cameras can be harnessed to allow a person to request that a nearby camera to take his or her photograph and/or video. A beacon may be used to transmit a request directly to the camera (or a receiver device connected to the camera). The beacon may include a reflective/fluorescent material, an RFID tag, and other components to transmit/receive a signal (e.g., a light, a radiofrequency transceiver, an ultrasonic transceiver, sensors, etc.).

The request can be generated by a processing circuit of the beacon or of a device coupled to the beacon. In some embodiments the beacon can indirectly transmit the request to the camera, e.g., it may send the request via a communications network (e.g., cellular or Wi-Fi network) to a website or electronic address communicatively coupled to the camera. Thus, based on the parameters of such a request, the nearby unmanned camera can automatically capture an image of the person. The request may include various conditions, contact information, image specifications, and/or pricing information related to a desired image, as will be discussed in further detail herein. It should be understood, that although the present application often uses the term "image," the scope of the present application is not limited to embodiments for requesting a still image (i.e. a photograph). Any of the embodiments disclosed herein allow a user to request a still image, a series of images, and/or a video clip, from an unmanned camera.

Referring to FIG. 1 a block diagram of mobile device 100 for requesting the capture of an image is shown. According to one embodiment, mobile device 100 is a device that includes beacon 102 and processing circuit 104. Such a device may be a laptop, a dedicated beacon device, a cellular phone, or any mobile device. Beacon 102 is generally configured to communicate with an unmanned camera. Beacon 102 may include one or more transmitters or communication components. In one embodiment, beacon 102 includes a light device (e.g., an LED, etc.) configured to generate pulses of light to communicate with the camera. In another embodiment, beacon 102 includes a radiofrequency transmitter configured to transmit an RF signal to communicate with the camera. In another embodiment, beacon 102 includes an ultrasonic transmitter configured to transmit an ultrasonic signal to communicate with the camera. Beacon 102 is configured to both send and receive data, and is communicably coupled to processing circuit 104. Processing circuit 104 interfaces with the components of beacon 102 to transmit a request for the camera to capture an image of the user of the mobile device 100. In one embodiment, beacon 102 includes a radiofrequency transceiver (e.g., a Wi-Fi device) of a mobile computer, and processing circuit 104 includes the processing components of the mobile computer. In another embodiment, beacon 102 includes an LED of a mobile device, and processing circuit 104 includes the processing components of the mobile device. In another embodiment, beacon 102 includes the cellular transceiver components of a wireless communication device, and processing circuit 104 includes the processing components of the wireless communication device. In another embodiment, beacon 102 and processing circuit 104 are part of a stand-alone requesting-device.

Figure 2:
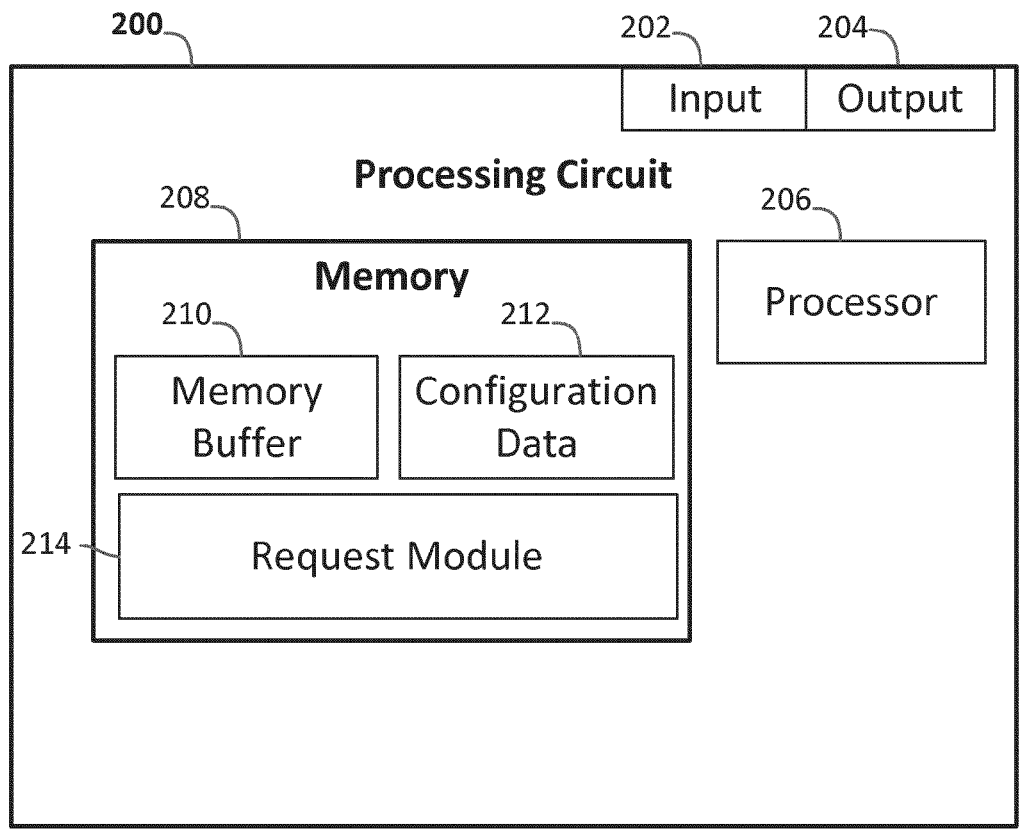
FIG. 2 is a block diagram of a processing circuit according to one embodiment.

Referring to FIG. 2, a block diagram of processing circuit 200 for implementing at least one embodiment is depicted. Processing circuit 200 is generally configured to communicate with a beacon to control the operation of the beacon. Processing circuit 200 is further configured to generate a request to be transmitted via the beacon. The request is for an unmanned camera to capture an image of the user. Processing circuit 200 may accept input data continuously or periodically. Processing circuit 200 uses the input data to control a configuration of the beacon and to set properties of the request. Processing circuit 200 generates various conditional data, pricing data, view constraint data, and contact data to be formatted as part of a request. Any of the data generated by processing circuit 200 may be based on user input or configuration data. In generating a request to be transmitted by the beacon, processing circuit 200 may make use of machine learning, artificial intelligence, interactions with databases and database table lookups, pattern recognition and logging, intelligent control, neural networks, fuzzy logic, etc. Processing circuit 200 further includes input 202 and output 204. Input 202 is configured to receive a data stream (e.g., a digital or analog stream of data) and configuration information. Output 204 is configured to output data for transmission (e.g., a request to be transmitted via the beacon) or for use in a configuration process of a device having processing circuit 200 and/or a beacon.

According to one embodiment, processing circuit 200 includes processor 206. Processor 206 may be implemented as a general-purpose processor, an application specific integrated circuit (ASIC), one or more field programmable gate arrays (FPGAs), a digital-signal-processor (DSP), a group of processing components, or other suitable electronic processing components. Processing circuit 200 also includes memory 208. Memory 208 may include one or more devices (e.g., RAM, ROM, Flash Memory, hard disk storage, etc.) for storing data and/or computer code for facilitating the various processes described herein. Memory 208 may be or include non-transient volatile memory or non-volatile memory. Memory 208 may include database components, object code components, script components, or any other type of information structure for supporting the various activities and information structures described herein. Memory 208 may be communicably connected to processor 206 and provide computer code or instructions to processor 206 for executing the processes described herein (e.g., the processes shown in FIGS. 4-9). Memory 208 may include memory buffer 210. Memory buffer 210 may be configured to receive a data stream from a user input and/or beacon through input 202. For example, the data may include input related to characteristics of an image requested by the user. As another example, the data may include input from a beacon configured to receive feedback from an unmanned camera. The data received through input 202 may be stored in memory buffer 210 until memory buffer 210 is accessed for data by the various modules of memory 208. For example, request module 214 can access the data that is stored in memory buffer 210. Any data received through input 202 may also be immediately accessed.

Memory 208 further includes configuration data 212. Configuration data 212 includes data related to processing circuit 200. For example, configuration data 212 may include information related to interfacing with other components (e.g., sensors and transmitters of the beacon, etc.). Configuration data 212 may also include the command set needed to generate a user interface or to communicate with other user interface components (e.g., a touch screen display, a keyboard, etc.). Based on data stored in configuration data 212, processing circuit 200 may format data for output via output 204, which may include formatting data for transmission via a beacon, etc. For example, processing circuit 200 may generate a request and format the request to be transmitted via a series of light pulses. As another example, processing circuit 200 may generate a request and format the request to be transmitted via a radiofrequency signal or ultrasonic signal, according to a wireless networking protocol. Processing circuit 200 may also format data for transmission according to any additional protocols or standards as specified by configuration data 212. Configuration data 212 may further include information as to how often input should be accepted from a sensor device. Configuration data 212 may include default values required to initiate communication with another device (e.g., a mobile phone, etc.) and with any components of the device having processing circuit

200. Configuration data 212 further includes data to configure communication between the various components of processing circuit 200.

Memory 208 further includes request module 214. Request module 214 is configured to receive input related to characteristics of requested image, generate a request based on the characteristics, and interface with a beacon (e.g., beacon 102). Request module 214 also may access configuration information and other data as provided by processing circuit 200. Request module 214 generates signals to cause the beacon to transmit a generated request.

In one embodiment, a user desires to have his image captured and uses the beacon to send a request to an unmanned camera. The request is unsolicited by the unmanned camera, and is generally broadcast from the beacon. Thus, a single nearby unmanned camera, or multiple nearby unmanned cameras may detect the request. Request module 214 generates the request based on input from the user or configuration data 212, and controls operation of the beacon such that the request is transmitted. The request may be transmitted by the beacon and received directly by the unmanned camera, or the request may be received by a separate receiver device, which forwards the request to the camera. For example, multiple unmanned cameras in a certain area may be connected to a single receiver device that is associated with the multiple unmanned cameras. The receiver device may be nearby the camera, or remotely positioned from the cameras, and may transmit a received request to one or more cameras in order to capture an image. In one embodiment, the beacon includes light generation components, and request module 214 controls the components to illuminate the light generation components in a certain pattern. Based on the illumination, an unmanned camera can detect the request (and the user) in a frame that the camera is capturing. The illumination pattern may be based a defined protocol that is stored in configuration data 212. In another embodiment, the beacon includes a radiofrequency transceiver, and request module 214 controls the transmitter to send a request signal. The request may be sent according to a defined protocol or on a certain frequency that is known the cameras. For example, according to one configuration with a certain camera system, an image request may be transmitted by a 150 MHz signal. In another embodiment, the beacon includes an ultrasonic transceiver, and request module 214 controls the transceiver to send an ultrasound signal that includes the request. For example, the request may be encoded in a 19 kHz sound wave. It should be understood that other frequencies may also be used, and the scope of the present application is not limited to the frequencies discussed above. Based on the data of the request, an unmanned camera may locate a user and capture the user's image as specified by the parameters of the request. An unmanned camera may locate the user based on the location of the beacon. For example, with a beacon that includes a light, a camera may detect the location of the illumination in the frame of the camera and base the location of the user on the detected illumination. An unmanned camera may also analyze the request data to locate the user. For example, the request may include GPS coordinates or other identification information such that a location of the user may be discerned. Additional characteristics related to a request may also be included in by request module 214. Any of the characteristics discussed herein may be based on user input, stored values, or configuration data 212.

In one embodiment, request module 214 generates a request that includes a condition that must be met by the captured image of the user. In other words, the request is for the unmanned camera to capture the user's image, but only under certain conditions. In this manner, a user can control the situations in which his image is captured, as an unmanned camera that receives the request can capture the image if the conditions are met, and the camera may disregard the request if the conditions have not been met. In one embodiment, request module 214 formats the request to include a view constraint for the image. For example, the view constraint may require the image to be a front/rear view of the user. As another example, the view constraint may require the image to be of a right/left profile view of the user. As another example, the view constraint may require a full body view, an upper body view, or only a facial view, etc. The view constraint may also specify a certain composition setting desired of the captured image. For example, view constraint may specify that the composition satisfy a rule of thirds composition, a golden ratio, or another photographic composition rule. As another example, the view constraint may specify what portion of the image the user desires to occupy (e.g., left side of the image, center of the image, etc.). The specified portion may be precisely defined or may be defined as an allowable range that is acceptable for the user to occupy.

In one embodiment, the request includes a condition that specifies whether certain objects or other people are allowed, not allowed, or are required to be in a captured image. For example, the condition may specify that only the user is allowed to be in the image. As another example, the condition may specify that other people are allowed in the image, but the image should not contain any cars. The condition may also specify the desired location of certain objects or people. For example, the condition may specify that other people are allowed in the image, as long as they are in the background, foreground, left/right side of the image, etc.

In one embodiment, the request includes a condition that specifies an image quality requirement. For example, the condition may specify that the user requires a certain resolution. The condition may further specify color settings related to the image. For example, the image may be requested to be taken in (or converted to) black and white, with a warming filter, a cooling filter, standard color, etc. The condition may further specify lighting requirements (e.g., a brightness or contrast required, etc.). The lighting requirements may include a range of acceptable values.

In one embodiment, the request includes a condition that specifies a timing requirement for the image. For example, the timing requirement may instruct the camera to capture the image the next time all of the conditions of the request can be satisfied. As another example, the timing requirement may instruct the camera to capture the image after a certain time period has elapsed (e.g., after 5 seconds, after 30 seconds, etc.) and any conditions have been satisfied. The timing requirement may also specify a range within which the image should be captured (if possible). For example, the timing requirement may instruct the camera to try and capture the image after 5 seconds have elapsed, but only for a period of 15 seconds total. Thus after 15 seconds have elapsed, if the image could not be captured because conditions of the request could not be satisfied, the request would expire. In one embodiment, the timing requirement specifies whether a still image, multiple still images, or a video clip is required. For example, if multiple images are requested, the timing requirement may instruct the camera to capture 5 images during the next 15 seconds, etc. As another example, the timing requirement that instruct the camera to capture 5 images but keep only the top rated image (or images). Various image rating algorithms may be used to rank a composition or quality of an image. Ratings may be based on the content and composition of the image including facial features, expressions, eye direction, etc. For example, if an image is captured where the user is blinking, it may not be rated as highly as an image where the user's eyes are open. As another example, if a video clip (rather than a still image) is requested, the timing requirement may specify a frame rate or length of video clip required.

In one embodiment, the request includes contact information for the user. For example, the request may include the user's name, an ID code/account number related to the user, an email address of the user, and/or a physical or mailing address of the user. The contact information may further include information specifying where to send captured images. For example, the request may instruct the unmanned camera to route a captured image to the user (e.g., to an email address listed in the contact information). As another example, the request may instruct an unmanned camera to automatically send a captured image and the user's contact information to a print shop, so that the image may be printed and mailed to an address in the contact information. As another example, the request may instruct an unmanned camera to route an image availability notification to the user (e.g., to his email address, to his mobile device via a text/MMS message, etc.) when the image is available for review. This notification may provide a preview version of the image (e.g., a thumbnail, a lower resolution version, a watermarked version, etc.). As another example, the request may instruct an unmanned camera to automatically send a captured image to a specified digital memory location, e.g., a server address, a website, a database, a digital locker, or the like. As another example, the request may instruct an unmanned camera to send a captured image directly to the beacon based on transmission settings (e.g., radiofrequency or ultrasonic signal configurations) specified in the contact information.

In one embodiment, the request can stipulate a user's willingness to pay for the images. The request may stipulate a price per image and/or a price for a set of images. A price may be stipulated based on a quality or view of the image. For example, the user may specify that he is willing to pay $5 for a highly rated image, $3 if the image is rated as average, and not pay anything if the image is poorly rated. As another example, the user may specify that he is willing to pay $5, but only if the camera was able to capture an image with the user centered in the frame. The request may further indicate how many copies of an image or how many separate views the user desires. A request may also include payment information (e.g., a full or partial payment required) so that the user may be billed. For example, the payment information may include information related to a credit card account, a bank account, or an online payment processor. In one embodiment, the request includes or facilitates a full or partial electronic payment (e.g., an electronic funds transfer) to an account related to the camera. In this manner, the user can pay for a requested image if the camera is able to capture the image as requested.

In one embodiment, request module 214 generates a solicited request. For example, the beacon may be configured to receive a signal from an unmanned camera (or from a separate transmitter associated with an unmanned camera). In this embodiment, the beacon includes a receiver device (e.g., a light sensor, a radiofrequency sensor, an ultrasonic sensor, etc.) that detects a probe signal from a camera. The probe signal may be used to notify request module 214 of the camera's presence. The probe signal may include additional details related to the camera, such as the camera's location, image price, or capabilities. Upon detection of the probe signal by request module 214, request module 214 may generate an alert for the user to notify the user of the camera's presence and availability to capture an image. For example, request module 214 may interface with various user interface components (e.g., a speaker, a display, a touch screen, etc.) so that the user may be provided the alert (e.g. a visual or audio alert). This allows a user to initiate a request if desired after the user is notified of the presence of an unmanned camera. For example, after receiving a notification that a camera is nearby and available to capture an image of the user, the user may use a user interface to enter details related to an image that the user desires to be captured by the camera. Based on the input, request module 214 generates the request as described herein, and causes the beacon to transmit the request to the camera.

In one embodiment, request module 214 is configured to rescind a request. In this embodiment, the beacon is configured to receive a confirmation signal from an unmanned camera (or from a separate transmitter associated with an unmanned camera). For example, after sending an initial request using the beacon, request module 214 may receive a signal (via the beacon) from the unmanned camera. The signal may include a confirmation that the initial request was received, that the camera will not comply with the request, or that an image was captured based on the request. Request module 214 may generate signals to use a user interface to notify the user of the confirmation. If for some reason the user desires to cancel the initial request, the user no longer wants the initial image, or the user would like to cancel any additional pending requests, the user can enter such cancellation instructions via the user interface. Request module 214 may format the cancellation instructions and transmit them (via the beacon) to the camera such that the request is rescinded, the captured image is disregarded, or any additional pending requests are rescinded.

It should be understood that request module 214 may generate a request that includes any of the various characteristics and conditions described herein. For example, a single request may include a view constraint, a lighting condition, a timing requirement, contact information, and/or payment information, etc. Further, a request can specify whether a captured image or video should or should not include metadata related to the image. For example, an image can be captured and include metadata related to a location or time of the image. However, if the request specifies that metadata is not desired, the image file for an image may be formatted without embedded metadata.

Figure 3:
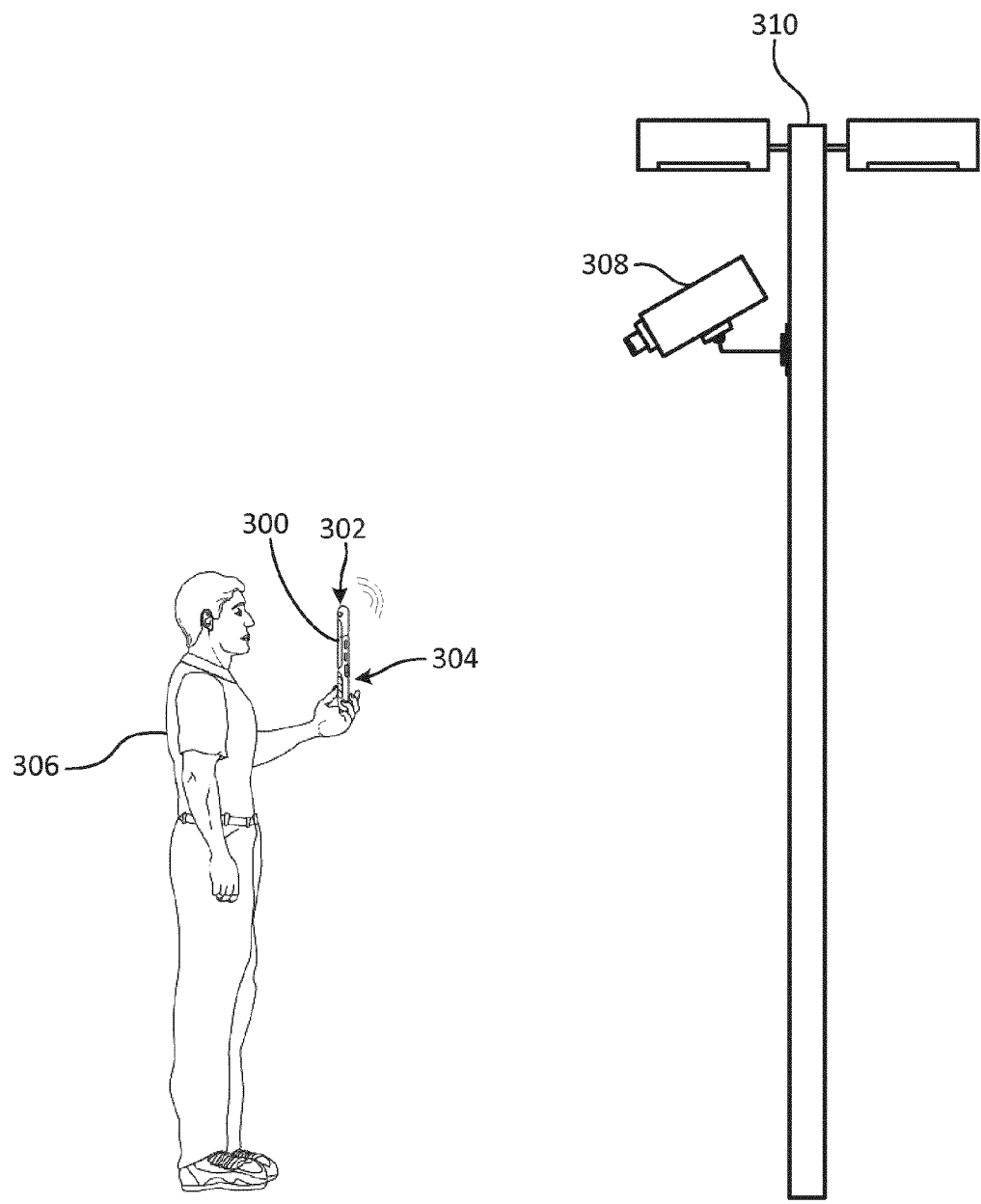
FIG. 3 is a schematic diagram of a mobile device for requesting the capture of an image according to one embodiment.

Referring to FIG. 3, a schematic diagram of a mobile device 300 for requesting the capture of an image is shown according to one embodiment. Mobile device 300 includes beacon 302 and processing circuit 304, which are depicted as components of a cellular phone. For example, beacon 302 may be a radiofrequency transmitter of the mobile device, and processing circuit 304 may include the processing components (e.g., processor, memory, etc.) of the mobile device. User 306 can use the user interface of the mobile device to enter details related to an image that user 306 desires to be captured by an unmanned camera. For example, user 306 may desire an image of user 306 centered in the frame and facing the camera, with nobody else in the frame. User 306 may also specify that he will pay $5 for the image and would like it emailed to his email address, and includes his credit card information. User 306 enters these details using the user interface (e.g., a keypad or touchscreen of the mobile device), and processing circuit 304 generates the request based on the details. Processing circuit 304 then causes beacon 302 to transmit the request according to a known radiofrequency signal. The request includes the GPS coordinates of user 306. Unmanned camera 308, which is depicted as being mounted to light pole 310, detects the request from beacon 302. If it is possible for camera 308 to capture the image according to the conditions of the request (where user 306 is centered and facing the camera, and no other person is in the frame), the image is captured and emailed to user 306. The credit card of user 306 may then be charged for the captured image based on the payment information included in the request.

Figure 4:
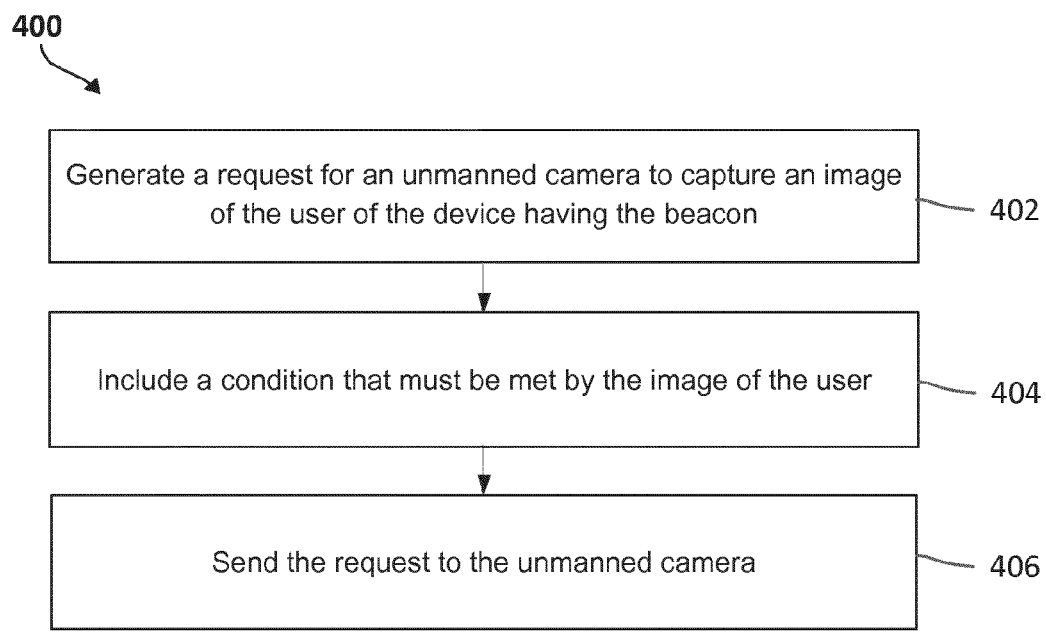
FIG. 4 is a flowchart of a process for requesting the capture of an image according to one embodiment.

Referring to FIG. 4, a flow diagram of a process 400 for requesting the capture of an image is shown, according to one embodiment. In alternative embodiments, fewer, additional, and/or different actions may be performed. Also, the use of a flow diagram is not meant to be limiting with respect to the order of actions performed. A request is generated for an unmanned camera to capture an image of the user of the device having the beacon (402). The beacon may be communicably coupled to a mobile device such as a laptop, a cellular phone, etc. Alternatively the beacon may be integrated into the mobile device. The request may be an unsolicited request, sent by the beacon. Alternatively, the request may be in response to a probe signal of the unmanned camera that was detected by the beacon or the mobile device. The request includes a condition that must be met by the image of the user (404). If the condition can be satisfied, the unmanned camera may capture the image. The request is sent to the unmanned camera (406). For example, the beacon may include a radiofrequency transmitter, an ultrasonic transmitter, or a light device, etc., that is configured to wirelessly communicate with the unmanned camera or a receiving device coupled to the unmanned camera.

Figure 5:
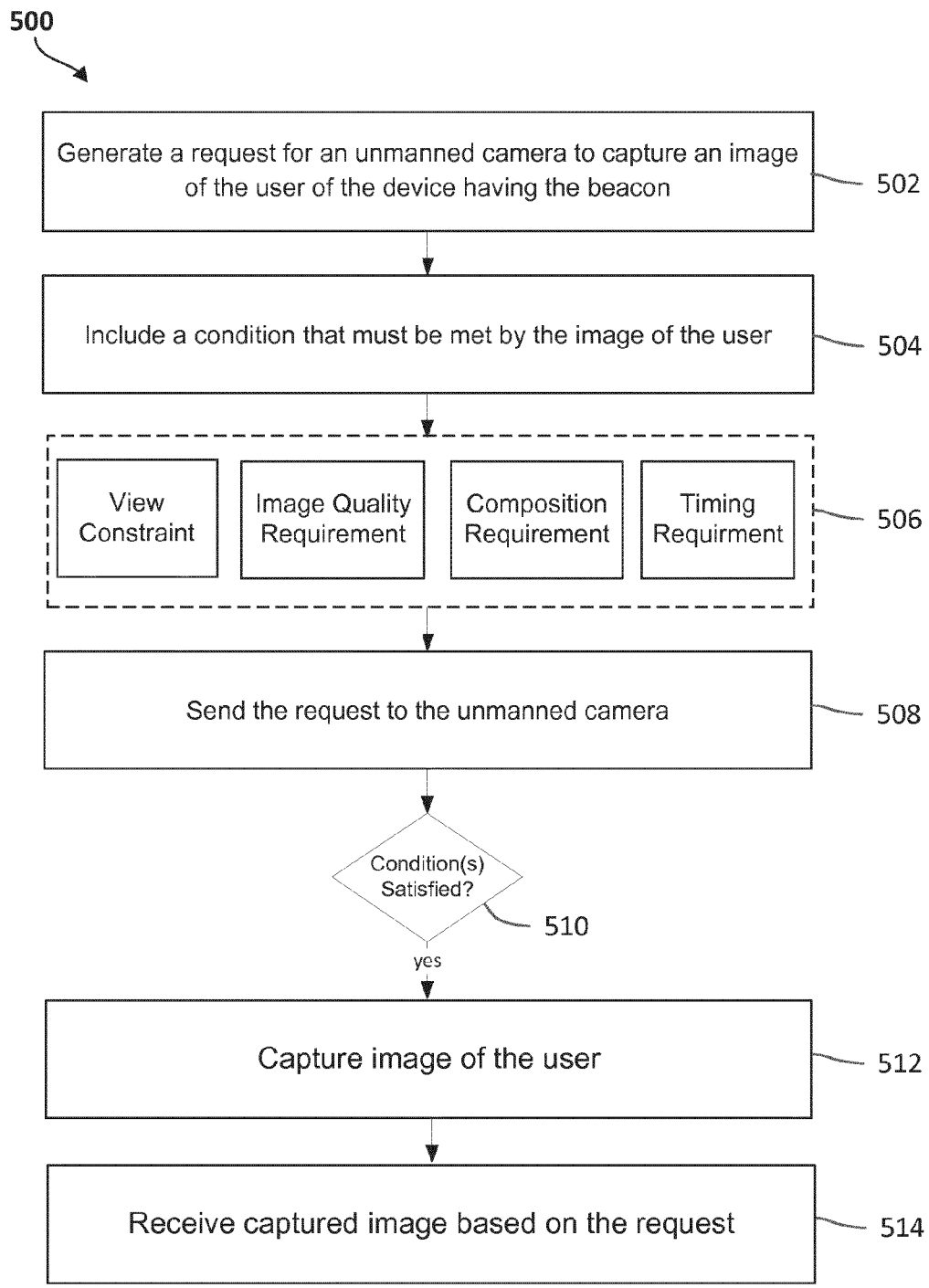
FIG. 5 is a flowchart of a process for requesting the capture of an image according to one embodiment.

Referring to FIG. 5, a flow diagram of a process 500 for requesting the capture of an image is shown, according to one embodiment. In alternative embodiments, fewer, additional, and/or different actions may be performed. Also, the use of a flow diagram is not meant to be limiting with respect to the order of actions performed. A request is generated for an unmanned camera to capture an image of the user of the device having the beacon (502). The request includes a condition that must be met by the image of the user (504). The condition may include one or more conditions required of the captured image (506). For example, as discussed in detail above, the condition may include a view constraint, an image quality requirement, a composition requirement, or a timing requirement. The request is sent to the unmanned camera (508). If each of the conditions of the request can be satisfied (510), then the unmanned camera may proceed to capture an image satisfying the various conditions (512). The captured image (or images or video) may be received directly via the beacon as specified by the request (514). Alternatively, the captured image may be sent to an email address, or otherwise routed as specified by the request.

Figure 6:
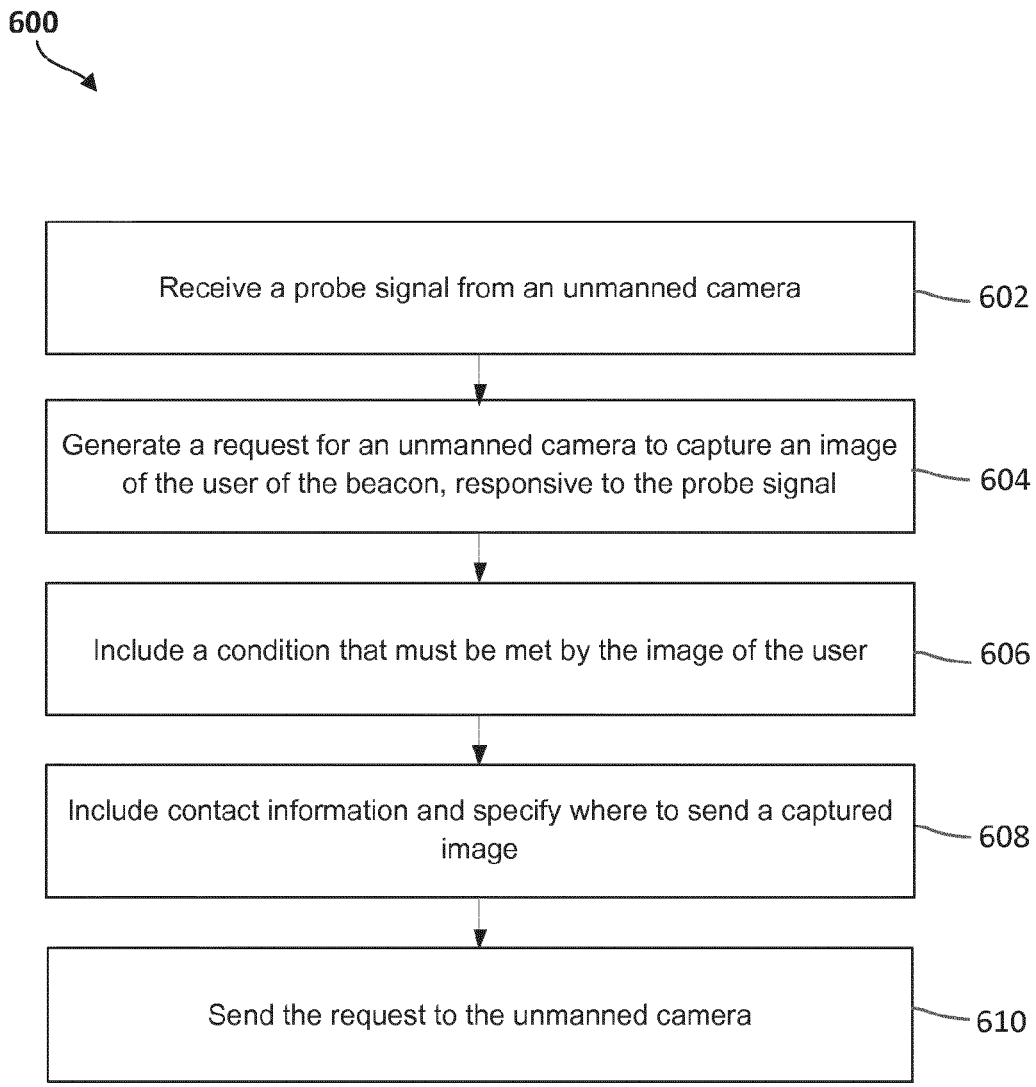
FIG. 6 is a flowchart of a process for requesting the capture of an image according to one embodiment.

Referring to FIG. 6, a flow diagram of a process 600 requesting the capture of an image is shown, according to one embodiment. In alternative embodiments, fewer, additional, and/or different actions may be performed. Also, the use of a flow diagram is not meant to be limiting with respect to the order of actions performed. A probe signal is received by the beacon from an unmanned camera (602). For example, the unmanned camera may detect an RFID tag of the beacon and transmit a communication probe signal based on RFID information, notifying the beacon of its presence. As another example, the unmanned camera may be broadcasting a generic probe signal (e.g., on a known frequency or channel, etc.) that the beacon can detect. In response to a detected probe signal, a request is generated for the unmanned camera to capture an image of the user of the beacon (604). The request includes a condition that must be met by the image of the user (606). The request includes contact information and specifies where to send a captured image (608). The request is transmitted to the unmanned camera (610).

Figure 7:
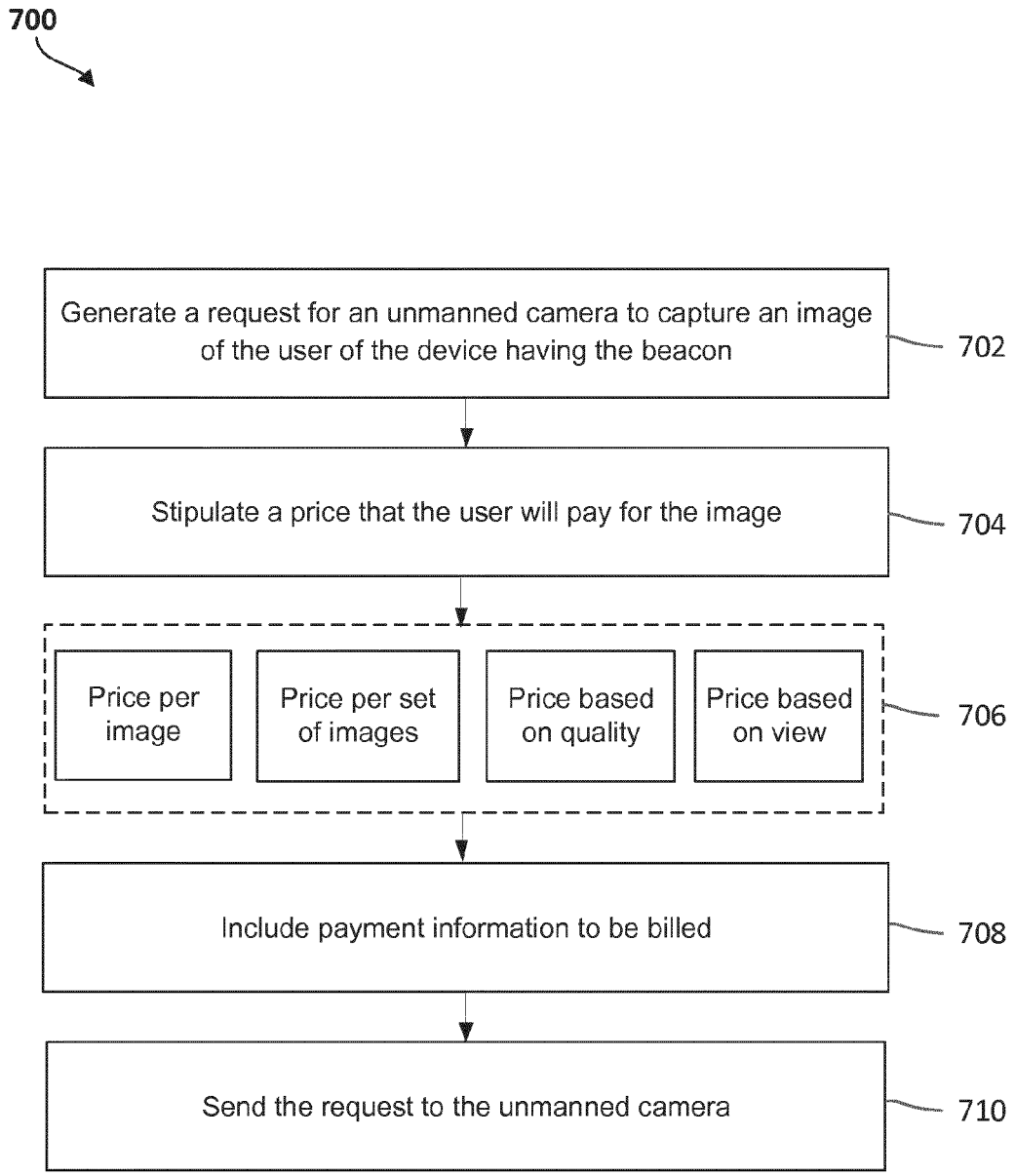
FIG. 7 is a flowchart of a process for requesting the capture of an image according to one embodiment.

Referring to FIG. 7, a flow diagram of a process 700 for requesting the capture of an image is shown, according to one embodiment. In alternative embodiments, fewer, additional, and/or different actions may be performed. Also, the use of a flow diagram is not meant to be limiting with respect to the order of actions performed. A request is generated for an unmanned camera to capture an image of the user of the device having the beacon (702). The request stipulates a price that the user will pay for the image (704). The price may include one or more pricing models (706). For example, the price may be specified to be a price per image captured, a price per set of images captured, a price based on the quality or view of the captured image (e.g., how clear it is, how bright it is, how well the image is composed, how much of the user was captured, etc.). The request includes payment information so that the user may be billed for the image (708). The request is sent to the unmanned camera (710).

Figure 8:
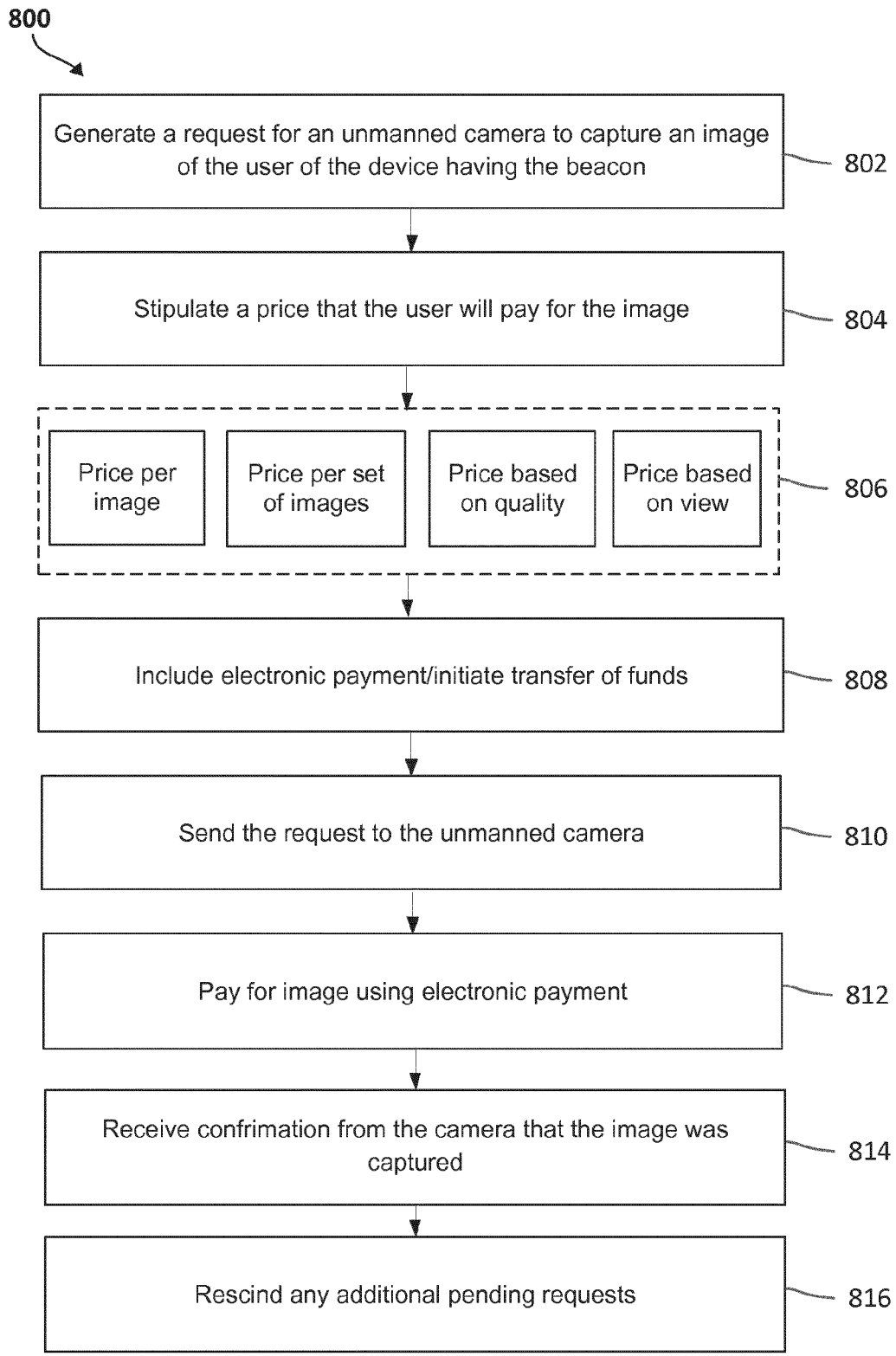
FIG. 8 is a flowchart of a process for requesting the capture of an image according to one embodiment.

Referring to FIG. 8, a flow diagram of a process 800 requesting the capture of an image is shown, according to one embodiment. In alternative embodiments, fewer, additional, and/or different actions may be performed. Also, the use of a flow diagram is not meant to be limiting with respect to the order of actions performed. A request is generated for an unmanned camera to capture an image of the user of the device having the beacon (802). The request stipulates a price that the user will pay for the image (804). The price may include one or more pricing models (806). The request further includes an electronic payment or initiates a transfer of funds to an account related to the unmanned camera (808). In this manner, the capture image may be paid for immediately upon capture of the image by the unmanned camera. The request is sent to the unmanned camera (810). Based on the included electronic payment, the image is paid for upon capture (812). The beacon may receive a confirmation from the camera that the image was captured as desired by the user (814). Based on the confirmation, the user may rescind any additional request that may be pending, if desired (816). For example, the beacon may be used to send a communication to the camera to notify the camera to rescind pending requests. As another example, the beacon may be used to send a communication to other cameras receiving the request to notify them to rescind the request (e.g., because a first camera already took an image satisfying the request).

Figure 9:
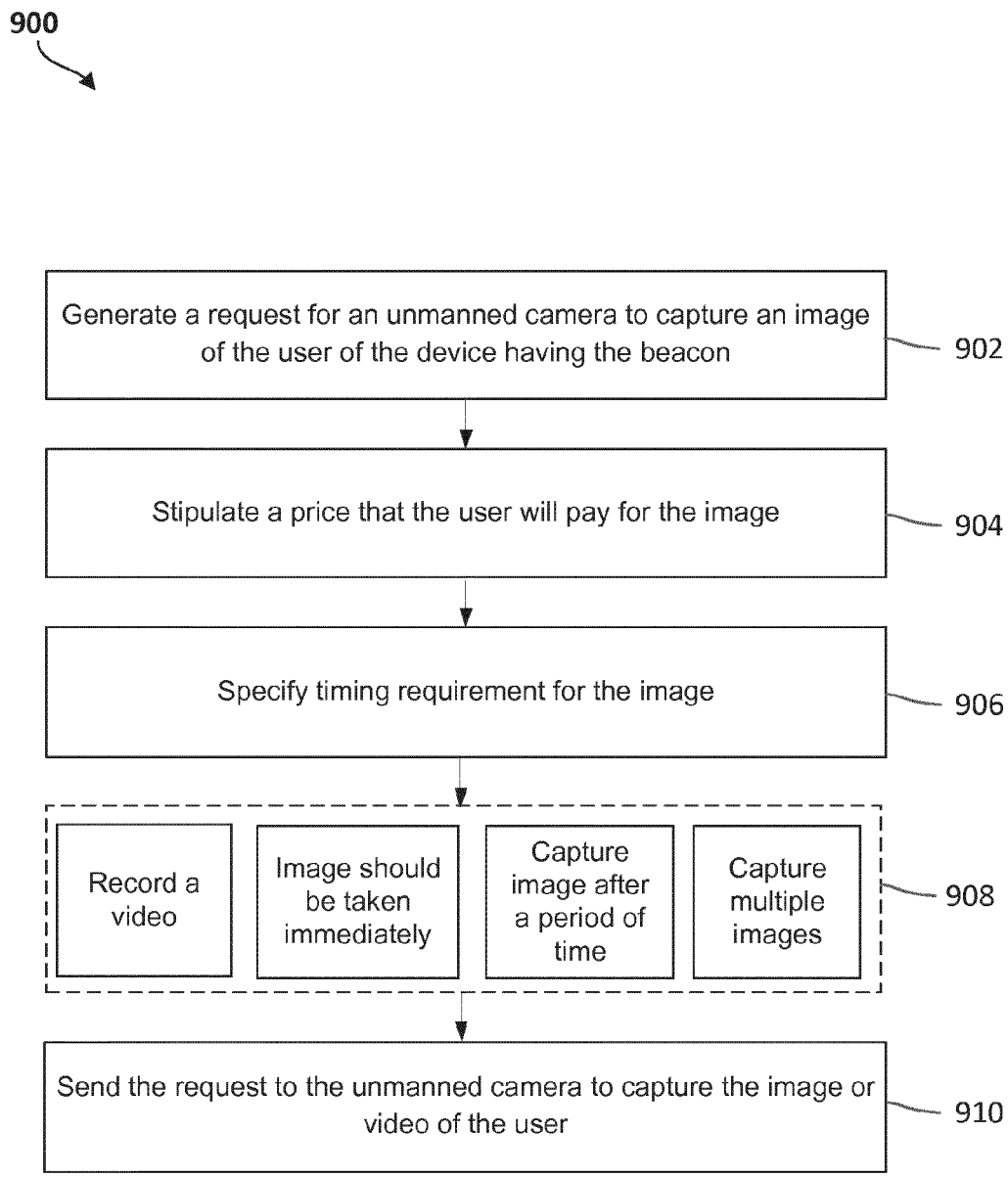
FIG. 9 is a flowchart of a process for requesting the capture of an image according to one embodiment.

Referring to FIG. 9, a flow diagram of a process 900 for requesting the capture of an image is shown, according to one embodiment. In alternative embodiments, fewer, additional, and/or different actions may be performed. Also, the use of a flow diagram is not meant to be limiting with respect to the order of actions performed. A request is generated for an unmanned camera to capture an image of the user of the device having the beacon (902). The request stipulates a price that the user will pay for the image (904). The request also specifies a timing requirement for the image as desired by the user (906). One or more timing requirements may be specified. For example, the user may desire a video to be captured by the unmanned camera. In this manner, the timing requirement may specify a length of a video clip desired. As another example, the timing requirement may specify that the image should be taken immediately, or as soon as any conditions required of the image are satisfied. As another example, the timing requirement may specify that the image should be captured after a certain period of time (e.g., after 30 seconds, after a minute, etc.). As another example, the timing requirement may specify that the unmanned camera should capture multiple images (e.g., three images total, one image every 15 seconds for a period of a minute, etc.). The request is sent to the unmanned camera to capture the image or video of the user (910).

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A mobile device for requesting a capture of an image, comprising:
a beacon configured to communicate with an unmanned camera; and
a processing circuit configured to:
generate a request for the unmanned camera to capture an image of a user of the mobile device, wherein the request includes a condition that must be met by the image of the user, wherein the request stipulates a price that the user is willing to pay for the image should the condition be met and a second price that the user is willing to pay for the image should the condition not be met; and
send the request, via the beacon, to the unmanned camera.

2. The mobile device of claim 1, wherein the request further includes a timing requirement for the image.

3. The mobile device of claim 2, wherein the timing requirement specifies that the image is part of a video and that the unmanned camera should record the video.

4. The mobile device of claim 2, wherein the timing requirement specifies that the image should be taken after a certain time period has elapsed.

5. The mobile device of claim 2, wherein the timing requirement specifies that the image should be taken the next time the condition is met.

6. The mobile device of claim 1, wherein the condition includes a view constraint for the image.

7. The mobile device of claim 6, wherein the view constraint requires at least one of a frontal view of the user, a left profile view of the user, a right profile view of the user, a rear view of the user, a full body view of the user, an upper body view of the user, and only a facial view of the user.

8. The mobile device of claim 1, wherein the condition specifies a quality of the image.

9. The mobile device of claim 8, wherein the quality includes at least one of a resolution requirement, a color setting, and a lighting condition.

10. The mobile device of claim 1, wherein the condition specifies a portion of the image that the user must occupy.

11. The mobile device of claim 1, wherein the condition specifies a composition requirement of the image.

12. The mobile device of claim 1, wherein the beacon includes a light transmitter, and wherein the beacon is configured to transmit light to communicate with the unmanned camera.

13. The mobile device of claim 1, wherein the beacon includes a radiofrequency transmitter, and wherein the beacon is configured to transmit a radiofrequency signal to communicate with the unmanned camera.

14. The mobile device of claim 1, wherein the beacon includes an ultrasonic transmitter, and wherein the beacon is configured to transmit an ultrasonic signal to communicate with the unmanned camera.

15. The mobile device of claim 1, wherein the beacon includes a receiver, wherein the processing circuit is further configured to receive a probe signal via the receiver of the beacon, wherein the probe signal is related to the unmanned camera, and wherein the request is generated in response to receiving the probe signal.

16. A method of requesting a capture of an image, comprising:
generating, with a processing circuit, a request for an unmanned camera to capture an image of a user of a mobile device comprising the processing circuit and a beacon, wherein the beacon is configured to communicate with the unmanned camera, wherein the request includes a condition that must be met by the image of the user, and wherein the condition specifies that a certain object is required to be in the image in addition to the user, wherein the request stipulates a price that the user is willing to pay for the image should the condition be met and a second price that the user is willing to pay for the image should the condition not be met; and
sending the request, via the beacon, to the unmanned camera.

17. The method of claim 16, further comprising receiving a confirmation from the unmanned camera, via the beacon, wherein the confirmation is related to the request.

18. The method of claim 17, further comprising rescinding the request based on input from the user and the received confirmation.

19. The method of claim 16, wherein the condition includes a view constraint for the image.

20. The method of claim 16, further comprising receiving a probe signal via a receiver of the beacon, wherein the probe signal is related to the unmanned camera, and wherein the request is generated in response to receiving the probe signal.

21. A mobile device for requesting a capture of an image, comprising:
a beacon configured to communicate with an unmanned camera; and
a processing circuit configured to:
generate a request for the unmanned camera to capture an image of a user of the mobile device, wherein the request includes a condition that must be met by the image of the user, wherein the condition specifies that a certain object or a certain person other than the user is required to be in the image in addition to the user, and wherein the request stipulates a first price that the user is willing to pay for the image should the condition be met, and wherein the request stipulates a second price that the user is willing to pay for the image should the condition not be met; and
send the request, via the beacon, to the unmanned camera.

22. The mobile device of claim 21, wherein the request further includes a timing requirement for the image.

23. The mobile device of claim 22, wherein the timing requirement specifies that the image is part of a video and that the unmanned camera should record the video.

24. The mobile device of claim 23, wherein the timing requirement further specifies a frame rate of the video.

25. The mobile device of claim 22, wherein the timing requirement specifies that multiple images should be taken, and wherein the request specifies that a best rated image of the multiple images should be selected as the image.

26. The mobile device of claim 21, wherein the request further includes contact information for the user, and wherein the contact information includes at least one of a first name, a last name, an email address, an ID code, and an address.

27. The mobile device of claim 26, wherein the request specifies that an image availability notification should be sent to the email address of the contact information.

28. The mobile device of claim 27, wherein the image availability notification includes a preview version of the image.

29. The mobile device of claim 21, wherein the request further includes payment information related to an account of the user.

30. The mobile device of claim 29, wherein the payment information includes an electronic transfer of payment.

31. The mobile device of claim 21, wherein the processing circuit is further configured to receive a confirmation from the unmanned camera, via the beacon, wherein the confirmation is related to the request.

32. The mobile device of claim 31, wherein the processing circuit is further configured to rescind the request based on input from the user and the received confirmation.

33. The mobile device of claim 21, wherein at least one of the first price and the second price is at least one of a price per image, for a set of images, based on quality rating of the image, and based on a view of the image.

34. The mobile device of claim 21, wherein the condition specifies at least one of a view constraint for the image, a portion of the image that the user must occupy, a composition requirement of the image, and a quality of the image.

35. The mobile device of claim 21, wherein the beacon includes a receiver, wherein the processing circuit is further configured to receive a probe signal via the receiver of the beacon, wherein the probe signal is related to the unmanned camera, and wherein the request is generated in response to receiving the probe signal.

\* \* \* \* \*